(12) United States Patent
Sakai et al.

(10) Patent No.: US 6,467,804 B2
(45) Date of Patent: Oct. 22, 2002

(54) VEHICLE SEAT

(75) Inventors: Morio Sakai, Toyota (JP); Kazunori Sakamoto, Chiryu (JP); Tsutomu Takeuchi, Gamagori (JP); Osamu Fujimoto, Nisshin (JP)

(73) Assignees: Aisin Seiki Kabushiki Kaisha, Kariya (JP); Toyota Jidosha Kabushiki Kaisha, Toyota (JP)

( * ) Notice: Subject to any disclaimer, the term of this patent is extended or adjusted under 35 U.S.C. 154(b) by 5 days.

(21) Appl. No.: 09/740,869

(22) Filed: Dec. 21, 2000

(65) Prior Publication Data

US 2001/0005074 A1 Jun. 28, 2001

(30) Foreign Application Priority Data

Dec. 24, 1999 (JP) ............................................. 11-366745

(51) Int. Cl.[7] ............................................... B60R 21/32
(52) U.S. Cl. ....................................... 280/735; 180/273
(58) Field of Search ........................ 280/735; 180/273, 180/271, 268; 297/217.2, 216.1; 340/666, 667

(56) References Cited

U.S. PATENT DOCUMENTS

| 5,474,327 | A | * | 12/1995 | Schousek | 280/735 |
|---|---|---|---|---|---|
| 5,618,056 | A | * | 4/1997 | Schoos et al. | 280/735 |
| 5,732,375 | A | * | 3/1998 | Cashler | 701/45 |
| 5,865,463 | A | * | 2/1999 | Gagnon et al. | 280/735 |
| 6,099,032 | A | * | 8/2000 | Cuddihy et al. | 280/735 |
| 6,199,902 | B1 | * | 3/2001 | Cooper et al. | 280/735 |
| 6,243,634 | B1 | * | 6/2001 | Oestreicher et al. | 701/45 |
| 6,264,236 | B1 | * | 7/2001 | Aoki | 280/735 |
| 6,282,473 | B1 | * | 8/2001 | Steffens, Jr. | 701/45 |
| 6,345,839 | B1 | * | 2/2002 | Kuboki et al. | 280/735 |

FOREIGN PATENT DOCUMENTS

JP 11-1153 1/1999

* cited by examiner

Primary Examiner—Paul N. Dickson
Assistant Examiner—David R. Dunn
(74) Attorney, Agent, or Firm—Burns, Doane, Swecker & Mathis, LLP

(57) ABSTRACT

A vehicle seat that detects a child restraint apparatus, which is attached to the seat by a seat belt, for operation of an air bag. A first load sensor is attached to one side of the seat to detect load and generate a first detection value. A second load sensor is attached to the seat at an opposite side of the seat to detect load and generate a second detection value. A control unit is connected to the first and second load sensors and determines whether the child restraint apparatus is present based on the first and second detection values.

18 Claims, 5 Drawing Sheets

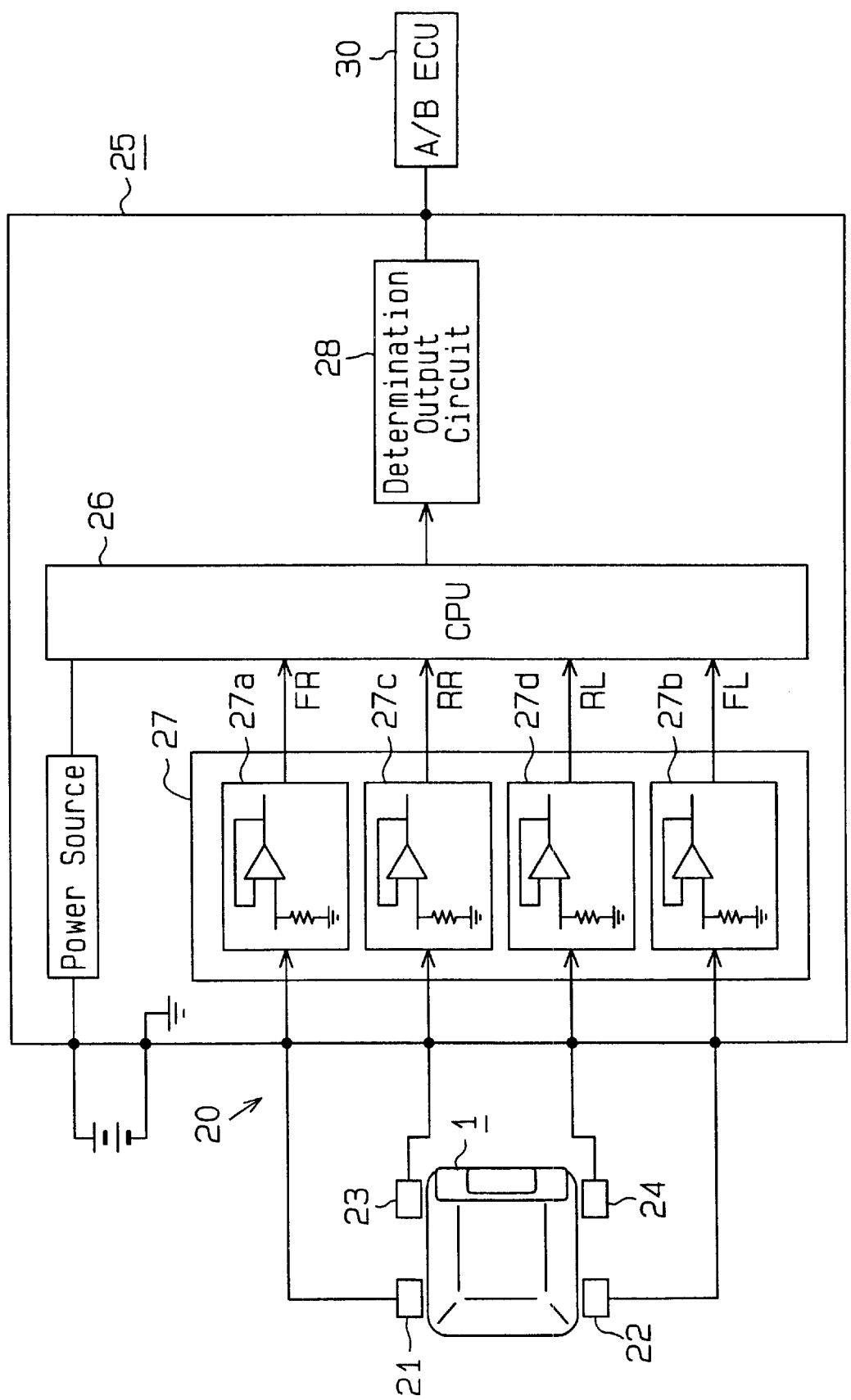

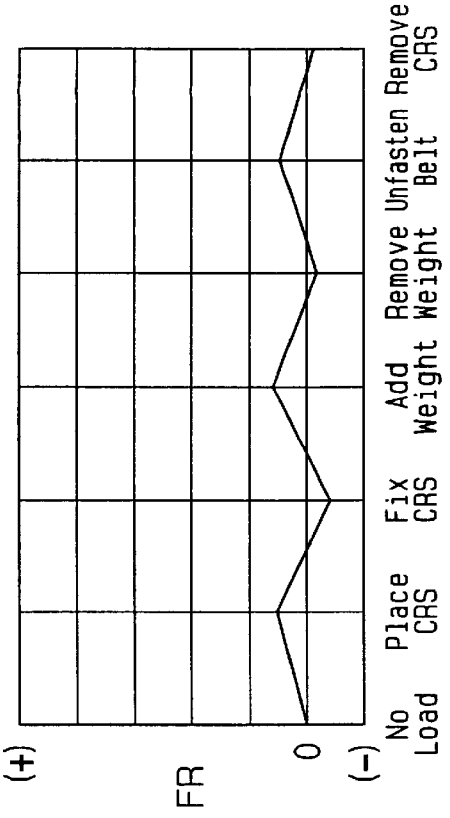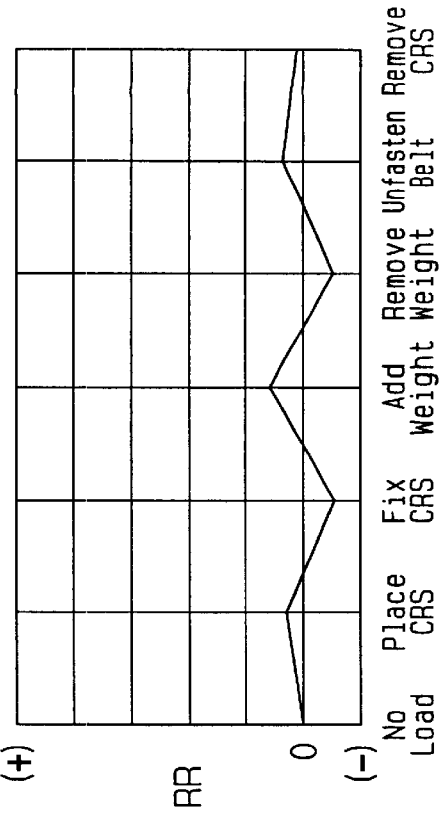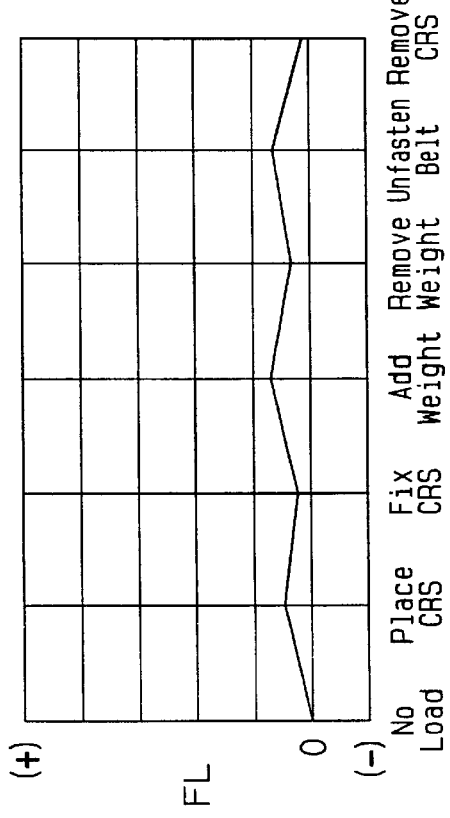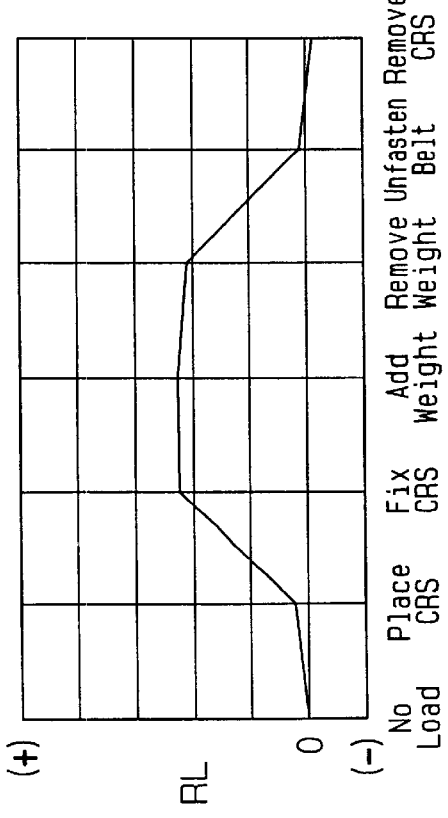

VEHICLE SEAT

BACKGROUND OF THE INVENTION

The present invention relates to a vehicle seat provided with a load detector.

A vehicle equipped with an air bag may be provided with load detectors to detect whether a passenger is sitting on a seat. The load detectors may also detect the weight of the passenger sitting on the seat to optimally adjust the amount of generated gas when the air bag is inflated.

Japanese Unexamined Patent Publication No. 11-1153 describes such load sensors. A seat is supported on left and right rails, each fixed to the floor of a vehicle by a mount bracket, so that the seat can be moved back and forth along the rails. A load sensor is arranged between each rail and the associated mount bracket. The weight of the seat is detected based on load signals generated by the load sensors.

A child restraint system (CRS) may be installed on a vehicle seat. When securing the CRS to the vehicle seat with a seat belt, the restraining force of the seat belt applies a large downward load on the seat. This affects the detection of each load sensor and results in the sensors detecting a weight that is greater than the actual weight of the CRS. As a result, the detection may, for example, erroneously indicate that a passenger is sitting on the seat. Hence, a vehicle seat that enables detection of a CRS is sought after.

SUMMARY OF THE INVENTION

It is an object of the present invention to provide a vehicle seat that detects a child restraint system.

To achieve the above object, the present invention provides a seat including a seat belt fastened to an anchor, which is located on one side of a rear portion of the seat.

The seat includes a first load sensor attached to the seat in the vicinity of the anchor to detect load and generate a first detection value representing the load detected by the first load sensor. A second load sensor is attached to the seat at a side opposite to the first load sensor to detect load and generate a second detection value representing the load detected by the second load sensor. A control unit is connected to the first and second load sensors. The control unit determines whether a child restraint apparatus is present based on the first and second detection values.

The present invention also provides a method for detecting whether a child restraint apparatus is fastened to a seat by a seat belt that is fastened to an anchor. The anchor is located on one side of a rear portion of the seat. The seat includes a first load sensor attached to the seat in the vicinity of the anchor to detect load and generate a first detection value representing the load detected by the first load sensor. A second load sensor is attached to the seat at a side opposite to the first load sensor to detect load and generate a second detection value representing the load detected by the second load sensor. The method includes comparing the first and second detection values, obtaining a difference between the first and second detection values, comparing the difference with a predetermined rear differential reference value, and determining that the child restraint apparatus is present when the second detection value is greater than the first detection value and the difference is greater than the rear differential reference value.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3(*b*) is a rear view showing a rear sensor bracket;

FIG. 4 is a block diagram showing the electric structure of the preferred embodiment;

FIGS. 6(*a*) to 6(*d*) are graphs showing the behavior of the values detected by load sensors.

DETAILED DESCRIPTION OF THE PREFERRED EMBODIMENTS

A vehicle seat according to a preferred embodiment of the present invention will now be described with reference to FIGS. 1 to 6.

Figure 1:
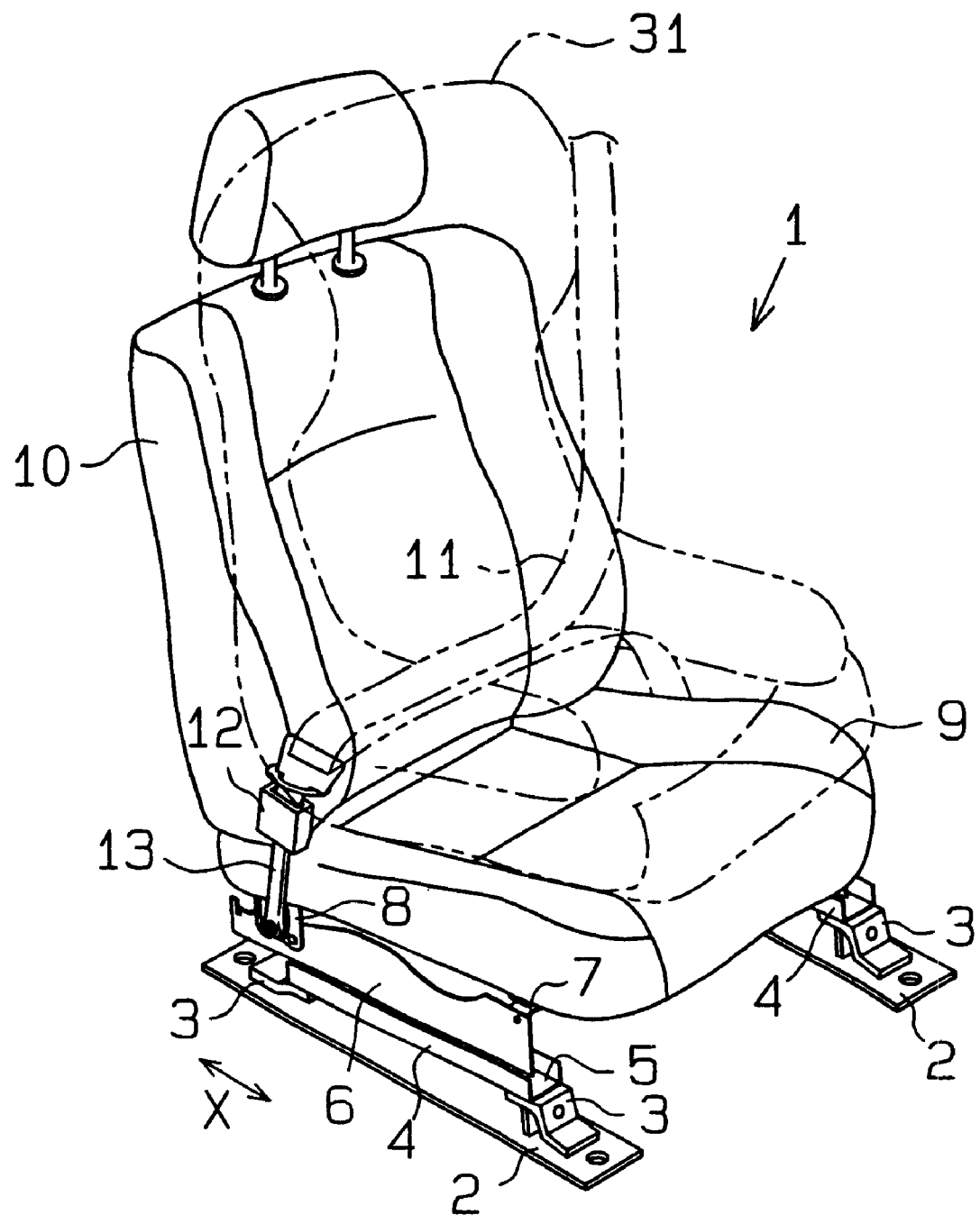
FIG. 1 is a perspective view showing a vehicle seat according to a preferred embodiment of the present invention.

FIG. 1 is a perspective view showing a vehicle seat 1.

A base frame 2, which extends in the longitudinal direction of the vehicle (the direction indicated by arrow X), is fixed to the floor (not shown) of the vehicle on each side of the seat 1. Front and rear brackets 3 are fixed to each base frame 2. A lower support 4 is fixed to each pair of brackets 3. The lower support 4 has a U-shaped cross-section and extends parallel to the corresponding base frame 2. A slide groove 5 extends longitudinally through each lower support 4.

Figure 2:
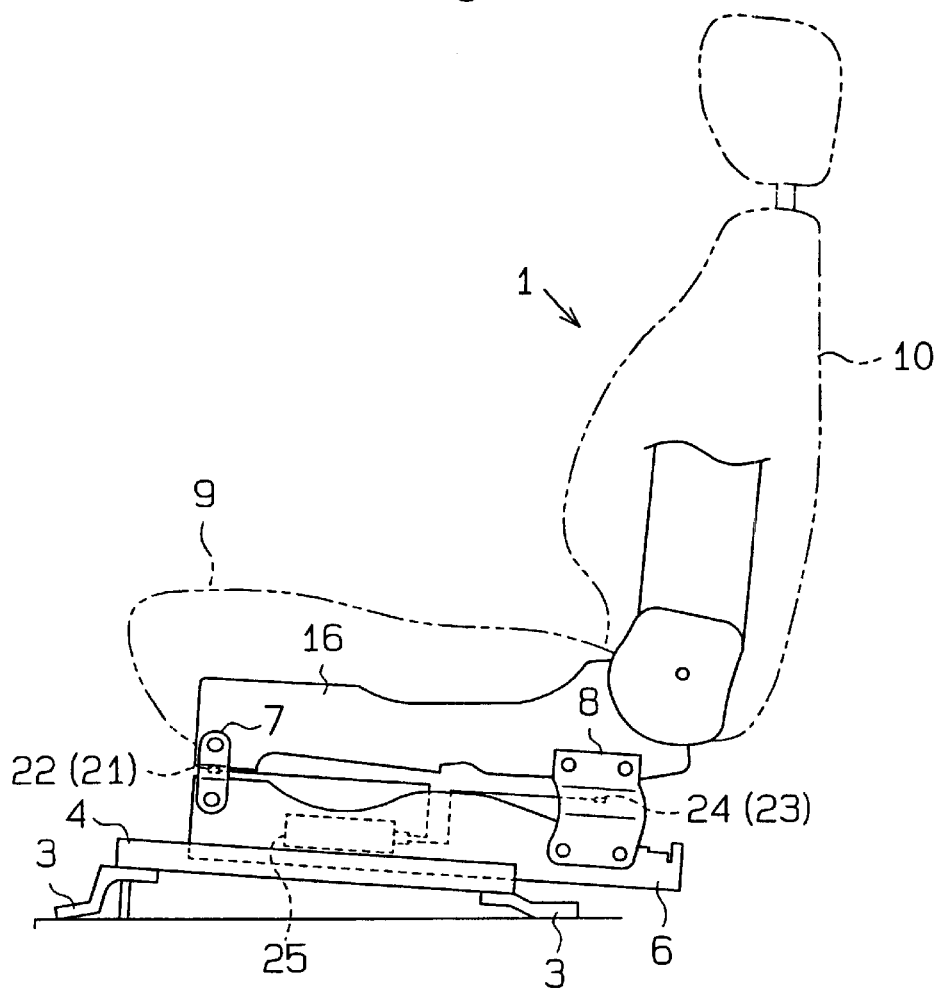
FIG. 2 is a side view showing the seat of FIG. 1.

Each slide groove 5 receives an upper support 6 so that the upper support 6 can slide along the slide groove 5. With reference to FIG. 2, a front sensor bracket 7 and a rear sensor bracket 8 connect an arm 16 to each upper support 6 such that the arm 16 is spaced from the upper support 6 by a predetermined distance. The left and right arms 16 support a seat cushion 9 and a seat back 10.

Figure 3A:
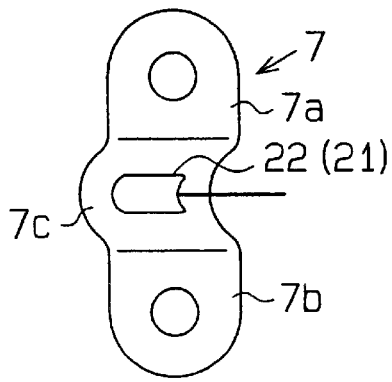
FIG. 3(*a*) is a front view showing a front sensor bracket.
Figure 3B:
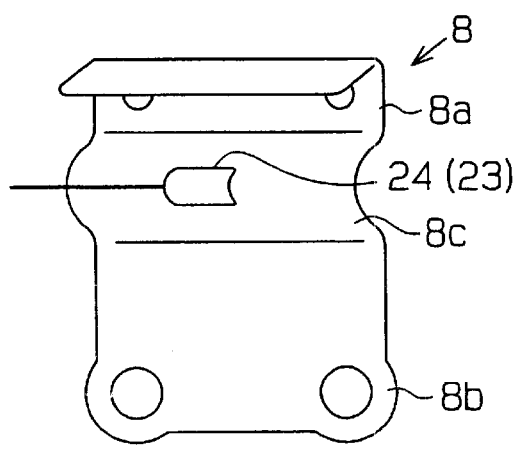

As shown in FIG. 3(*a*), each front sensor bracket 7 has an upper end 7*a* and a lower end 7*b*. A curved deformation portion 7*c* is defined between the upper and lower ends 7*a*, 7*b*. The upper end 7*a* is connected to the front section of the associated arm 16, and the lower end 7*b* is connected to the front section of the associated upper support 6. A right front load sensor 21 is attached to the deformation portion 7*c* of the right front sensor bracket 7, and a left front load sensor 22 is attached to the deformation portion 7*c* of the let front sensor bracket 7. The left and right front load sensors 21, 22 each include a strain detector, such as a strain gauge. The strain detector electrically detects the degree of deformation of the associated deformation portion 7*c* relative to the load applied to the seat cushion 9.

As shown in FIG. 3(*b*), each rear sensor bracket 8 has an upper end 8*a* and a lower end 8*b*. A curved deformation portion 8*c* is defined between the upper and lower ends 8*a*, 8*b*. The upper end 8*a* is connected to the rear section of the associated arm 16, and the lower end 8*b* is connected to the rear section of the associated upper support 6. A right rear load sensor 23 is attached to the deformation portion 8*c* of the right rear sensor bracket 8. A left rear load sensor 24 is attached to the deformation portion 8*c* of the left rear sensor bracket 8. In the same manner as the front load sensors 21, 22, the left and right rear load sensors 23, 24 each include a strain detector, such as a strain gauge. The strain detector electrically detects the degree of deformation of the associated deformation portion 8c according to the load applied to the seat cushion 9.

A belt anchor 12 and an anchor bracket 13 are connected to one of the upper supports 6 (the left upper support 6 in FIG. 1). A seat belt 11 is fastened to the belt anchor 12.

FIG. 4 is a block diagram showing the electric structure of a seat load detector 20. The load detector 20 includes the load sensors 21, 22, 23, 24 and an electronic control unit (ECU) 25. The ECU 25 has a central processing unit (CPU) 26, a sensor signal input circuit 27, and a determination output circuit 28.

The sensor signal input circuit 27 includes active filters 27a, 27b, 27c, 27d that are associated with the load sensors 21, 22, 23, 24, respectively. The sensors 21, 22, 23, 24 generate load signals provided to the CPU 26 via the associated active filters 27a, 27b, 27c, 27d. Each of the active filters 27a–27d is a known low-pass filter. A low-pass filter is configured, for example, by combining a passive element, which includes a capacitor and a resistor, with an active element, which includes an amplifier. Among the load signals generated by the load sensors, the active filters 27a, 27b, 27c, 27d pass only low frequency signals and eliminate other signals.

Front detection values FR, FL are obtained from the load signals of the right and left front load sensors 21, 22 that pass through the active filters 27a, 27b. A rear-right detection value RR is obtained from the load signal of the right rear load sensor 23 that passes through the active filter 27c, and a rear-left detection value RL is obtained from the load signal of the left rear load sensor 24 that passes through the active filter 27d.

The CPU 26 performs various operations, which are based on prestored control programs and initial data, and provides operational results to the determination output circuit 28.

AS shown by the broken lines in FIG. 1, a child restraint seat (CRS) 31 may be installed on the seat 1. The CRS 31 is fastened to the seat 1 by the seat belt 11. FIGS. 6(a), 6(b), 6(c), 6(d) respectively show the behavior of the detections values FL, FR, RL, RR (as confirmed by the inventors) when using the CRS 31.

FIGS. 6(a) to 6(d) each show the corresponding detection values FL, FR, RL, RR in seven different states. In the first state, there is no load applied to the seat 1. The CRS 31 is placed on the seat 1 in the second state and fastened to the seat 1 by the seat belt 11 in the third stave. A weight of, for example, 18 kilograms is added to the CRS 31 to simulate a child sitting on the CRS 31 in the fourth state. The weight is removed from the CRS 31 in the fifth state. The seat belt 11 is unfastened in the sixth state, and the CRS 31 is removed from the seat 1 in the seventh state.

From the graphs of FIGS. 6(a) to 6(d), it is apparent that the rear-right detection value RR and the front detection values FR, FL vary within a small range. The rear-left detection value RL, which represents the load applied to the rear portion of the seat 1 at the side opposite to the belt anchor 12 varies significantly. Accordingly, the CRS 31 may be detected by comparing the rear-right detection value RR of the right rear load sensor 23 and the rear-left detection value RL of the left rear load sensor 24. The right and left rear load sensors 23, 24 are connected to the rear portion of the seat 1 under substantially the same conditions. Further, the rear-left detection value RL increases significantly RL, when installing the CRS. 31. Thus, when installing the CRS 31, the rear-left detection value FL, the sum of the first to front detection values RR, RL, FR, FL, and the sum of the first and rear-left detections values RR, RL increase. In addition, It is apparent that the rear-right detection value RR varies within a relatively narrow range when installing the CRS 31.

Figure 5:
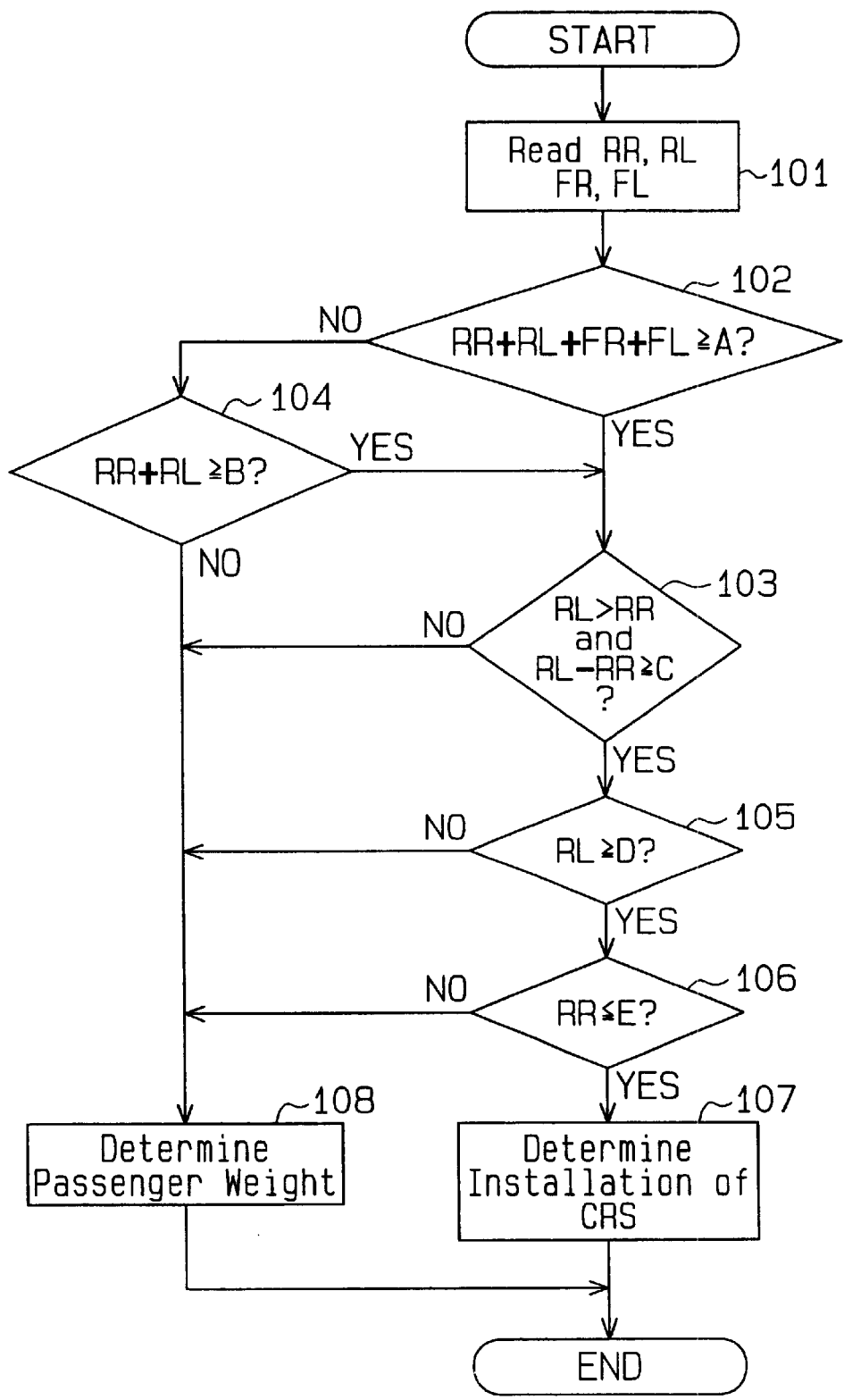
FIG. 5 is a flowchart illustrating the detection procedure in the preferred embodiment.

The CRS 31 is detected based on the behavior of the detection values RR, RL, FR, FL through a routine illustrated in the flowchart of FIG. 5. The routine is performed in interrupts at predetermined time intervals.

When entering the routine, at step 101, the CPU 26 reads the four detection values RR, FL, FR, FL. At step 102, the CPU 26 determines whether or not the sum of the four detection values RR, RL, FR, FL is greater than or equal to a predetermined value A (total sum reference value). The predetermined value A is set at a value that permits confirmation of a significant increase in the sum of the four detection values RR, RL, FR, FL when the CRS 31 is installed.

If the CPU 26 determines that the sum of all four detection values RR, FL, FR, FL is greater than or equal to the predetermined value A, the CPU 26 proceeds to step 103. If the CPU 26 determines that the sum of all four detection values RR, RL, FR, FL is less than the predetermined value A, the CPU 26 proceeds to step 104 to further determine whether or not the sum of the first and rear-left detection values RR, RL is greater than or equal to a predetermined value B (rear sum reference value). The predetermined value B is set at a value that permits confirmation of a significant increase in the sum of the rear detection values RR, RL when the CRS 31 is installed. If the CPU 26 determines that the sum of the rear detection values RR, RL is greater than or equal to the predetermined value B, the CPU 26 proceeds to step 103. In other words, the CPU 26 proceeds to step 103 when the sum of all four values RR, RL, FR, FL is greater than or equal to the predetermined value A or when the sum of the rear detection values RR, RL is greater than of equal to the predetermines value B.

At step 103, the CPU 26 determines whether or not the rear-left detection value RL is greater than the rear-right detection value RR and whether the difference between the rear-left detection value RL and the rear-right detection value RR is greater than or equal to a predetermined value C (rear differential reference value). The predetermined value C is set at a value that permits confirmation of a significant increase in the difference between the rear-left detection value RL and the rear-right detection value RR when the CRS 31 is installed. If the CPU 26 determines that the rear-left detection value RL is greater than the rear-right detection value RR and that the difference between the rear-left detection value RL and the rear-right detection value RR is greater than or equal to the predetermined value C, the CPU 26 proceeds to step 105.

At step 105, the CPU 26 determines whether or not the rear-left detection value RL is greater than or equal to a predetermined value D (first reference value). The predetermined value D is set at value that permits confirmation of a significant increase in the rear-left detection value RL when the CRS 31 is installed. If the CPU 26 determines that the rear-left detection value RL is greater than or equal to the predetermined value D, the CPU 26 proceeds to step 106.

At step 106, the CPU 26 determines whether the rear-right detection value RR is less than or equal to a predetermined value E (second reference value). The predetermined value E is set at a value that permits confirmation of a significant decrease in the rear-right detection value R when the CRS 31 is installed. If the CPU 26 determines that the rear-right detection value RR is less than or equal to the predetermined value E, the CPU 26 determines that the CRS 31 is installed and proceeds to step 107.

When the CPU 26 performs step 107, the CPU 26 sends a signal indicating that the CRS 31 is installed to, for example, an air bag ECU 30 through the determination output circuit 28. The CPU 26 then temporarily terminates subsequent processing. If a condition set in any one of steps 103 to 106 is not satisfied, the CPU 260 determines that the CRS 31 is not installed and proceeds to step 108.

When the CPU 26 performs step 108, the CPU 26 determines that the CRS 31 is not installed and obtains the load applied to the seat 1 (i.e., the weight of the passenger if one is sitting on the seat 1) based on, for example, the sum of the four detection values RR, RL, FR, FL. The CPU 26 then provides the result to, for example, the air bag ECU 30 via the determination output circuit 28. Afterward, the CPU 26 temporarily terminates subsequent processing.

The air bag ECU 30 optimally controls the operation of an air bag based on the results provided by the CPU 26. The advantages described below are obtained by the preferred embodiment.

(1) The detection value RR of the right rear load sensor 23 and the detection value RL of the left rear load sensor 24 vary significantly when the CRS 31 is installed. This characteristic is used to facilitate detection of the CRS 31. In other words, the CRS 31 is easily detected by comparing the rear detection values RR, RL, that is, by determining whether or not the rear-left detection value RL is greater than the rear-right detection value RR and whether or not the difference between the rear-left detection value RL and the rear-right detection value RR is greater than or equal to the predetermined value C.

(2) The predetermined value A is set to permit confirmation of an increase in the sum of the four detection values RR, RL, FR, FL when the CRS 31 is installed. Thus, the CRS 31 is accurately detected by determining whether or not the sum is greater than or equal to the predetermined value A.

(3) The predetermined value B is set to permit confirmation of an increase in the sum of the rear detection values RR, RL when the CRS 31 is installed. Thus, the CRS 31 is detected with further accuracy by determining whether or not the sum is greater than or equal to the predetermined value B.

(4) The predetermined value D is set to permit confirmation of an increase in the rear-left detection value RL when the CRS 31 is installed. Thus, the CRS 31 is detected with further accuracy by determining whether or not the rear-left detection value RL is greater than or equal to the predetermined value D.

(5) The predetermined value E is set to permit confirmation of a decrease in the rear-right detection value RR when the CRS 31 is installed. Thus, the CRS 31 is detected with further accuracy by determining whether or not the rear-right detection value RR is less than or equal to the predetermined value E.

(6) When the CPU 26 determines that the CRS 31 is not installed, the weight (load) of the passenger sitting on the seat 1 (if a passenger is sitting on the seat 1) is determined based on, for example, the sum of all four detection values RR, RL, FR, FL.

(7) The operation of the air bag is optimally controlled in accordance with the absence or presence of the CRS 31 or the weight (load) of the passenger sitting on the seat 1.

(8) The front detection values FR, FL are obtained from the load signals of the right and left front load sensors 21, 22 that pass through the active filters 27a, 27b. The rear-right detection value RR is obtained from the load signal of the right rear load sensor 23 that passes through the active filter 27c, and the rear-left detection value RL is obtained from the load signal of the left rear load sensor 24 that passes through the active filter 27d. Thus, the detection values FR, FL, RR, RL are obtained under stable conditions.

It should be apparent to those skilled in the art that the present invention may be embodied in many other specific forms without departing from the spirit or scope of the invention. Particularly, it should be understood that the present invention may be embodied in the following forms.

The shape of the front and rear sensor brackets 7, 8 illustrated in FIGS. 3(*a*) and 3(*b*) may be changed when necessary as long as they strain in accordance with the weight applied to the seat 1.

The locations of the load sensors 21–24 (front and rear sensor brackets 7, 8) may be changed as long as they permit detection of the weight applied to the seat 1.

Two load sensors (the right and left front load sensors 21, 22) are employed as the front load sensors. However, additional load sensors may be used for the front load sensors.

The right and left front load sensors 21, 22 may be omitted. In this case, the detection of the CRS 31 based on the sum of the four detection values RR, RL, FR, FL (step 102) is eliminated. This would reduce the number of load sensors and save costs.

As long as the CPU 26 determines whether or not the rear-left detection value RL is greater than the rear-right detection value RR and whether or not the difference between the rear detection values RL, RR is greater than or equal to a predetermined value, the other conditions (steps 102 and 104 to 106) may be omitted.

Instead of determining whether or not the CRS 31 is installed based on the difference between the rear-left detection value RL and the rear-right detection value RR, for example, the ratio between the rear-left detection value RL and the rear-right detection value RR may be evaluated to determine whether the CRS 31 is installed.

Although the drawings show a seat designed for the left side of a vehicle, the present invention may be applied to a seat arranged on either side of a vehicle as long as the seat has a structure enabling detection of the CRS 31. If the seat is located on the right side of the vehicle, the signals designated in the routine of FIG. 5 are changed accordingly.

The present examples and embodiments are to be considered as illustrative and not restrictive, and the invention is not to be limited to the details given herein, but may be modified within the scope and equivalence of the appended claims.

What is claimed is:

1. A seat including a seat belt fastened to an anchor, wherein the anchor is located on one side of a rear portion of the seat, the seat comprising:

a first load sensor attached to the seat in the vicinity of the anchor to detect load and generate a first detection value representing the load detected by the first load sensor;

a second load sensor attached to the seat at a side opposite to the first load sensor to detect load and generate a second detection value representing the load detected by the second load sensor; and a control unit connected to the first and second load sensors, wherein the control unit compares the first detection value with the second detection value to determine whether a child restraint apparatus is present.

2. The seat according to claim 1, wherein the control unit obtains a difference between the first and second detection values, compares the difference with a predetermined rear differential reference value, and determines that the child restraint apparatus is present when the second detection value is greater than the first detection value and the difference is greater than the rear differential reference value.

3. The seat according to claim 2, wherein the control unit adds the first and second detection values to obtain a rear load sum and compares the rear load sum with a predetermined rear sum reference value to determine whether the child restraint apparatus is present.

4. The seat according to claim 2, further comprising a third load sensor connected to the control unit and attached to the seat in front of the first load sensor to detect load and generate a third detection value representing the load detected by the third load sensor, and a fourth load sensor connected to the control unit and attached to the seat in front of the second load sensor to detect load and generate a fourth detection value representing the load detected by the fourth load sensor, wherein the control unit adds the first, second, third, and fourth detection values to obtain a total load sum and compares the total load sum with a predetermined total sum reference value to determine whether the child restraint apparatus is present.

5. The seat according to claim 2, further comprising a third load sensor connected to the control unit and attached to the seat in front of the first load sensor to detect load and generate a third detection value representing the load detected by the third load sensor, and a fourth load sensor connected to the control unit and attached to the seat in front of the second load sensor to detect load and generate a fourth detection value representing the load detected by the fourth load sensor, wherein the control unit adds the first and second detection values to obtain a rear load sum, compares the rear load sum with a predetermined rear sum reference value, adds the first, second, third and fourth detection values to obtain a total load sum, compares the total load sum with a predetermined total sum reference value, and determines that the child restraint apparatus is present when at least one of the rear and total load sums is greater than the associated reference value.

6. The seat according to claim 2, wherein the control unit compares the second detection value with a predetermined first reference value and determines that the child restraint apparatus is present when the second detection value is greater than the first reference value.

7. The seat according to claim 2, wherein the control unit compares the first detection value with a second reference value, and determines that the child restraint apparatus is present when the first detection value is less than the second reference value.

8. The seat according to claim 2, further comprising a front load sensor located in front of the first and second load sensors and attached to the seat, wherein the front load sensor is connected to the control unit.

9. The seat according to claim 1, wherein the control unit evaluates a ratio of the first and second detection values, and determines that the child restraint apparatus is present when the second detection value is greater than the first detection value and the ratio satisfies a predetermined condition.

10. The seat according to claim 1, wherein the control unit controls operation of an air bag in accordance with the presence of the child restraint seat.

11. A method for detecting whether a child restraint apparatus is fastened to a seat by a seat belt that is fastened to an anchor, wherein the anchor is located on one side of a rear portion of the seat, and wherein the seat includes a first load sensor attached to the seat in the vicinity of the anchor to detect load and generate a first detection value representing the load detected by the first load sensor, a second load sensor attached to the seat at a side opposite to the first load sensor to detect load and generate a second detection value representing the load detected by the second load sensor, the method comprising:
    comparing the first and second detection values;
    obtaining a difference between the first and second detection values;
    comparing the difference with a predetermined rear differential reference value; and
    determining that the child restraint apparatus is present when the second detection value is greater than the first detection value and the difference is greater than the rear differential reference value.

12. The method according to claim 11, further comprising:
    adding the first and second detection values to obtain a rear load sum;
    comparing the rear load sum with a predetermined rear sum reference value; and
    determining that the child restraint apparatus is present when the rear load sum is greater than the predetermined fear sum reference value.

13. The method according to claim 11, wherein the seat further includes a third load sensor connected to the control unit and attached to the seat in front of the first load sensor to detect load and generate a third detection value representing the load detected by the third load sensor, and a fourth load sensor connected to the control unit and attached to the seat in front of the second load sensor to detect load and generate a fourth detection value representing the load detected by the fourth load sensor, the method further comprising:
    adding the first, second, third, and fourth detection values to obtain a total load sum;
    comparing the total load sum with a predetermined total sum reference value; and
    determining that the child restraint apparatus is present when the total load sum is greater than the predetermined total sum reference value.

14. The method according to claim 11, wherein the seat further includes a third load sensor connected to the control unit and attached to the seat in front of the first load sensor to detect load and generate a third detection value representing the load detected by the third load sensor, and a fourth load sensor connected to the control unit and attached to the seat in front of the second load sensor to detect load and generate a fourth detection value representing the load detected by the fourth load sensor, the method further comprising:
    adding the first and second detection values to obtain a rear load sum;
    comparing the rear load sum with a predetermined rear sum reference value;
    adding the first, second, third, and fourth detection values to obtain a total load sum;
    comparing the total load sum with a predetermined total sum reference value; and
    determining that the child restraint apparatus is present when at least one of the rear and total load sums is greater than the associated predetermined threshold value.

15. The method according to claim 11, further comprising:
- comparing the second detection value with a predetermined first reference value; and
- determining that the child restraint apparatus is present when the second detection value is greater than the first reference value.

16. The method according to claim 11, further comprising:
- comparing the first detection value with a predetermined second reference value; and
- determining that the child restraint apparatus is present when the first detection value is less than the second reference value.

17. The method according to claim 11, further comprising:
- evaluating a ratio of the first and second detection values; and
- determining that the child restraint apparatus is present when the second detection value is greater than the rear differential reference value and the ratio satisfies a predetermined condition.

18. The method according to claim 11, further comprising controlling operation of an air bag in accordance with the presence of the child restraint apparatus.

* * * * *